(12) United States Patent
Inaba et al.

(10) Patent No.: US 6,395,400 B1
(45) Date of Patent: May 28, 2002

(54) MAGNETIC RECORDING MEDIUM

(75) Inventors: Hiroo Inaba; Masaki Suzuki; Hiroaki Takano; Masatoshi Takahashi, all of Odawara (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/351,325

(22) Filed: Jul. 12, 1999

(30) Foreign Application Priority Data

Jul. 13, 1998 (JP) ............................................ 10-197820

(51) Int. Cl.$^7$ .......................... B32B 27/08; B32B 27/34
(52) U.S. Cl. ................. 428/477.7; 428/474.7; 428/428 SG; 428/428 SL; 428/900
(58) Field of Search ....................... 428/694 B, 694 ST, 428/694 SL, 474.4, 474.7, 475.2, 476.3–476.9, 477.4, 477.7

(56) References Cited

U.S. PATENT DOCUMENTS 6,017,605 A * 1/2000 Yamazaki et al. .......... 428/65.3

FOREIGN PATENT DOCUMENTS

JP 10176071 * 6/1998

OTHER PUBLICATIONS

Derwent Account No. 1998–422450.*
English Translation of JP 10–176071.*
Polymers: Chemistry and Physics of Modern Materials (Ed. J. Cowie, 2nd edition, Pub: Blackie Acad. & Prof., 1991, pp. 287–288).*

* cited by examiner

Primary Examiner—Steven A. Resan
Assistant Examiner—Kevin M. Bernatz
(74) Attorney, Agent, or Firm—Sughrue Mion, PLLC

(57) ABSTRACT

A magnetic recording medium using a biaxially oriented aromatic polyamide film as a nonmagnetic support resulting in hardly any improper windings or edge damages. The magnetic recording medium includes a magnetic layer containing ferromagnetic powders dispersed in a binder formed on the nonmagnetic support, wherein the biaxially oriented aromatic support has a ratio of the loss tangent at a temperature of 40° C. to the loss tangent at a temperature of 100° C. of 0.7 or higher.

6 Claims, No Drawings

MAGNETIC RECORDING MEDIUM

BACKGROUND OF THE INVENTION

1. Field of the Invention

This invention relates to a magnetic recording medium which comprises a nonmagnetic support having thereon a magnetic layer comprising a ferromagnetic powder dispersed in a binder, wherein the nonmagnetic support is made of an aromatic polyamide resin and, more particularly, to a magnetic recording medium hardly sustaining improper tape winding or edge damages.

2. Description of Prior Art

Magnetic recording media are required to satisfy various characteristics. For example, a magnetic recording tape used for an audio tape for reproduction of music recordings requires high original sound reproduction capability, while a magnetic recording tape used for a videotape requires high original picture reproduction capability. In addition to such electromagnetic characteristics, the magnetic recording tape requires good running performance and running durability. Recently, such a magnetic recording tape requires to record signals with high density. For media for computer storage, particularly, for compact backup system tapes as represented by the D8 and the DDS, the media are required to have a thinner total tape thickness for a large capacity.

To response various demands as above, various improvements are added to respective structural elements of the magnetic recording media. The magnetic recording medium generally has a magnetic layer on one side of the nonmagnetic support (optionally, a nonmagnetic undercoating layer may be formed when necessary) and a back-coating layer on the other side of a nonmagnetic support. To cope with downsizing and higher density recording, not only the magnetic layer but also the entire layers constituting the magnetic recording medium are required to be thinner. To make the thickness of the magnetic recording tape thinner, conventionally, the nonmagnetic support was made thinner, or the nonmagnetic layer formed between the nonmagnetic support and the magnetic layer was made thinner. If the nonmagnetic support is made thinner below a certain range, however, the medium loses the running durability. If the nonmagnetic layer is made thinner, the medium suffers from lowered outputs, increased error rates, and increased dropouts. Therefore, for the magnetic recording tapes for the DDS-2 and DDS-3 formats, aramid based supports (see, Japanese Patent No. 2,724,581) came to be used as a nonmagnetic support for improving the electromagnetic characteristics and the running durability, instead of polyester based supports such as polyethyleneterephthalate (PET) and polyethylenenaphthalate (PEN), which are used conventionally. Particularly, when the tape thickness is made thinner, it becomes difficult to keep strong contact of the head with the tape surface, and it is therefore desirable to use a support having a high module of elasticity. Consequently, aromatic polyamide (aramid) came to be used these days.

However, we have discovered that when the aromatic polyamide is used as the nonmagnetic support, tape edges of the magnetic recording tape become thicker as the tape runs more frequently, thereby creating an improper winding or thereby sustaining edge damages that the tape edges are worn out. This would cause the tape to be unable to run. This tendency is remarkable in a videotape for business use in which cueing, reviewing, and so on are frequently used.

Thus, in magnetic recording media using an aromatic polyamide as a nonmagnetic support, occurrences of improper windings and edge damages raise serious problems. Therefore, it is an object of the invention to provide a magnetic recording medium using an aromatic polyamide film as a nonmagnetic support and hardly sustaining improper windings and edge damages.

SUMMARY OF THE INVENTION

The inventors have diligently researched magnetic recording media to accomplish the above object. Consequently, the inventors have found out that the problems of sustaining improper windings and edge damages could be solved by selection of an aromatic polyamide having a loss tangent satisfying prescribed conditions for a magnetic recording medium even where an aromatic polyamide is used for nonmagnetic support, and reaches the completion of the invention.

According to the invention, a magnetic recording medium comprises a nonmagnetic support made of aromatic polyamide resin, and a magnetic layer formed on the nonmagnetic support containing ferromagnetic powders dispersed in a binder, wherein the magnetic recording medium has a loss tangent at the temperature of 40° C. is 0.7 or higher with respect to a loss tangent at the temperature of 100° C.

In the above magnetic recording medium, the loss tangent at the temperature of 40° C. is preferably 1 or higher with respect to a loss tangent at the temperature of 100° C., and the loss tangent at the temperature of 100° C. is preferably 0.05 or lower.

In another aspect of the invention, a magnetic recording medium comprises a nonmagnetic support made of aromatic polyamide resin, and a magnetic layer formed on the nonmagnetic support containing ferromagnetic powders dispersed in a binder, wherein the magnetic recording medium has a loss tangent at the temperature of 100° C. of 0.05 or lower. In this magnetic recording medium, the loss tangent at the temperature of 100° C. is preferably 0.01 or higher.

In any magnetic recording medium according to the invention, a nonmagnetic layer mainly containing nonmagnetic inorganic powders and a binder may be formed on the nonmagnetic support, and the magnetic layer containing the ferromagnetic powders and the binder and having a thickness of 0.05 µm or larger and 1.0 µm or lower may be formed on the nonmagnetic layer.

DESCRIPTION OF THE PREFERRED EMBODIMENTS

The magnetic recording medium according to the invention comprises a nonmagnetic support and a magnetic layer formed on the nonmagnetic support containing ferromagnetic powders dispersed in a binder, and is characterized in using an aromatic polyamide resin as the nonmagnetic support and having a loss tangent at the temperature of 40° C. of 0.7 or higher with respect to a loss tangent at the temperature of 100° C. In this magnetic recording medium according to the invention, the above problems can be solved by selecting an aromatic polyamide resin having a loss tangent at the temperature of 40° C. of 0.7 or higher with respect to a loss tangent at the temperature of 100° C. [$0.7 \leq \tan\delta$ (40° C.)/$\tan\delta$ (100° C.)]. Preferably, $0.7 \leq \tan\delta$ (40° C.)/$\tan\delta$ (100° C.)$\leq 2$, and more preferably, $0.8 \leq \tan\delta$ (40° C.)/$\tan\delta$ (100° C.)$\leq 1.5$.

To raise the capability of editing in a videotape for business use, the tape should be run in various running styles. During cueing mode or reviewing mode, the tape is made to run at a high speed even though a short period of time, and the tape becomes a high temperature because the tape is subject to high speed contacts, and conversely, during a normal play mode, the tape receives contacts for a long period of time, though the tape is subject to weak contacts and a relatively lower temperature. Running of the tape at a high temperature largely influences viscoelasticity of the tape but the property at a relatively low temperature is also important. To make stable the tape running at a high temperature though a short period of time and the tape running at a relatively low temperature for a long period of time, it is preferable to set the loss tangent indicating the viscoelasticity of the magnetic recording medium constant notwithstanding the temperature or frequency. The above problem can be solved by rendering the magnetic recording medium satisfy the above condition of $0.7 \leq \tan\delta$ (40° C.)/$\tan\delta$ (100° C.).

Generally, a loss tangent of a magnetic recording medium is relatively low at 40° C. or around room temperature, although the loss tangent has tendency to increase as temperature increases. Accordingly, in the magnetic recording medium of the invention, in addition to the rate of $\tan\delta$ (40° C.)/$\tan\delta$ (100° C.), the loss tangent (absolute value) at the temperature of 100° C. is also preferably small at 0.05 or lower.

The magnetic recording medium of the invention comprises a nonmagnetic support made of aromatic polyamide resin, and a magnetic layer formed on the nonmagnetic support containing ferromagnetic powders dispersed in a binder, wherein the magnetic recording medium has a loss tangent at the temperature of 100° C. of 0.05 or lower.

As described above, to gain a stable running property, a loss tangent of a proper viscoelasticity is required, and it is desirable that the loss tangent is constant notwithstanding temperature and frequency. The loss tangent generally has a tendency that the loss tangent is relatively low at 40° C. around a room temperature but increases as the temperature goes up. In the magnetic recording medium according to the invention, the above problem can be solved by selecting the nonmagnetic support made of the aromatic polyamide resin to be made of a material whose tan $\delta$ (100° C.) is 0.05 or lower. The loss tangent of the magnetic recording medium at 100° C. is preferably 0.01 or higher.

The aromatic polyamide film used in this invention is a film base obtained from making an aromatic polyamide into a film. The aromatic polyamide can be, for example, a material containing 50% or more of units as indicated by a general formula,

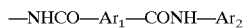

wherein, $Ar_1$ and $Ar_2$ are bivalent organic groups having at least one aromatic ring whose carbon number is preferably within 6 to 25; or

wherein, $Ar_3$ is a bivalent organic group having at least one aromatic ring whose carbon number is preferably within 6 to 25. For example, paraphenyleneterephthalamide, paraphenyleneisophthalamide, metaphenyleneterephthalamide, metaphenyleneisophthalamide, and so on are exemplified. Furthermore, the material also includes materials having substituents such as a nitro group, an alkyl group, an alkoxyl group, or the like on the phenyl nucleus. Among those aromatic polyamides, a material essentially having the paraphenyleneterephthalamide is preferable, which has a strong mechanical strength, a high modulus of elasticity, a low moisture absorptibity, a good heat resistance, and a good size stability from mechanical and thermal aspects, and therefore, the material is suitable for a material for good high density recording medium.

As a monomer constituting the aromatic polyamide thus structured, an acid chloride such as terephthalic acid chloride and the like, and a diamine such as paraphenylenediamine, metaphenylenediamine and the like can be exemplified. Particularly, an aromatic polyamide film used for the nonmagnetic support in this invention is preferably one not containing chlorine and is more preferably made of a PPTA (polyparaphenyleneterephthalamide) as represented by a formula

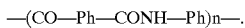

The above aromatic polyamide is set forth in, e.g., Japanese Patent No. 2628898. Such an aromatic polyamide is commercially available, and for example, Aramica (trademark) made by Asahi Chemical Industry Co., Ltd. can be exemplified. The thickness of the aromatic polyamide film used in this invention is generally in a range of 1.0 to 10 μm, preferably, 2.0 to 6.0 μm, and more preferably, 3.0 to 5.0 μm. The magnetic recording medium of the invention has a proper thickness of the entire layers of 2 μm or above and less than 7 μm, preferably, 2 μm or above and less than 6.8 μm, from a viewpoint of obtaining a thinner medium and with a higher density in use of an aramide film.

The magnetic layer of the magnetic recording medium of the invention has a structure that ferromagnetic powders are dispersed in a binder. The ferromagnetic powders used here are, e.g., powders of ferromagnetic iron oxide, cobalt containing ferromagnetic iron oxide, barium ferrite, and ferromagnetic metal powders. The ferromagnetic powders have an SBET (BET specific surface area) of 40 to 80 m²/g, preferably 50 to 70 m²/g. The crystallite size is 12 to 25 nm, preferably 13 to 22 nm, more preferably 14 to 20 nm. The major axis length is of 0.05 to 0.25 μm, preferably, 0.07 to 0.2 μm, more preferably, 0.08 to 0.15 μm. The pH of the ferromagnetic powders is preferably 7 or higher. As ferromagnetic metal powders, exemplified are a simple substance or alloy of Fe, Ni, Fe—Co, Fe—Ni, Co—Ni, Co—Ni—Fe, etc. and the powders may contain, in a range in 20% or less by weight of metal component or components, aluminum, silicon, sulfur, scandium, titanium, vanadium, chrome, manganese, copper, zinc, yttrium, molybdenum, rhodium, palladium, gold, tin, antimony, boron, barium, tantalum, tungsten, rhenium, silver, lead, phosphorus, lanthanum, cerium, praseodymium, neodymium, tellurium, bismuth, and so on. The magnetic powders may contain as described in Japanese Unexamined Patent Publication (KOKAI) Heisei No. 8-255334 which corresponds to U.S. application Ser. No. 08/862,262 filed May 23, 1997, Co of 10 to 40 atomic %, Al of 2 to 20 atomic %, and Y of 1 to 15 atomic %, with respect to Fe, from a viewpoint of improvements of dispersing property by reducing sintered portions. The ferromagnetic powders may contain a small amount of water, hydrides, and oxides.

The ferromagnetic powders used in the magnetic layer of the magnetic recording medium of the invention preferably have Fe as an essential component, a length of major axis of 0.05 to 0.19 μm, a crystallite size of 100 to 230 Å from a viewpoint of reduction of noises in filling the magnetic powders with a high density. The ferromagnetic powders used in the magnetic layer of the invented magnetic recording medium has a coercive force of 1650 to 3000 Oe, and σs of 125 to 180 emu/g from a viewpoint of reduction of recording demagnetization loss and prevention of reduction of the magnetization amount due to heat deviations. Furthermore, the SSA (specific surface area) of the ferromagnetic powders is preferably, 35 to 60 m²/g in terms of appropriate disperse liquid viscosity and affinity to the binder. Some methods for manufacturing such ferromagnetic powders are already known publicly, and the ferromagnetic powders used in this invention can be manufactured according to the known methods.

There is no special limitation to the shape of the ferromagnetic powders, but ordinarily, the powders in an acicular shape, a grain shape, a dice shape, a rice grain shape (or may be called as a spindle shape) or a plate shape may be used. Particularly, ferromagnetic powders in an acicular shape or a spindle shape are preferably used.

In this invention, the binder, the hardening agent, and the ferromagnetic powders are kneaded and dispersed together with a solvent or solvents such as methyl ethyl ketone, dioxane, cyclohexanone, ethyl acetate, toluene which are ordinarily used in preparation of magnetic paints to form paints for formation of magnetic layers. Such kneading and dispersing operation can be done in an ordinary fashion.

The binder usable in the magnetic layer of the magnetic recording medium of the invention can be conventionally known, thermoplastic resins, thermosetting resins, and reactive resins. Preferable binders are vinyl chloride resin, vinyl chloride-vinyl acetate resin, fiber based resin such as nitrocellulose, phenoxy resin, polyurethane resin, and so on. It is preferable, among those, to use vinyl chloride resin, vinyl chloride-vinyl acetate resin, and polyurethane resin since they can reduce transfers on the back side where the hardness of the back coating layer is made closer to the hardness of the magnetic layer. It is also preferable for the binder to contain as a part a polyurethane resin containing ring structures and ether groups in terms of improvements of dispersion property.

Particularly, desirable binders are a polyurethane resin obtained from reaction between a diol and an organic diisocyanate resin. The polyurethane resin contains a short chain diol having a ring structure or structures and a long chain diol having an ether linkage or linkages, as a diol, of 17 to 40% by weight and 10 to 50% by weight, respectively, with respect to the polyurethane resin, and the ether linkage in the long chain diol, of 1.0 to 5.0 mol/g with respect to the polyurethane resin. Hereinafter, the polyurethane resin is described.

The short chain diol has a molecular weight 50 or higher and less than 500, more preferably, 100 to 300. As specific examples, aromatic or alicyclic diols such as a cyclohexane-1,4-diol, cyclohexane-1,4-dimethanol, bisphenol A, bisphenol A hydride, bisphenol S, bisphenol P, those added with ethylene oxide, or propylene oxide, cyclohexane dimethanol, and cyclohexane diol can be exemplified.

The long chain diol has a molecular weight of 500 or higher and less than 5000. As specific examples, exemplified are bisphenol A and bisphenol A hydride added with ethylene oxide or propylene oxide, having a molecular weight of 500 or higher and less than 5000. A desirable short chain diol and long chain diol are indicated by the following Formula (1):

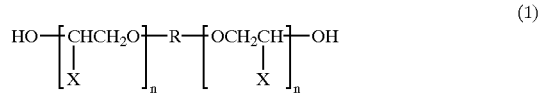
(1)

In a case of short chain diols, the numerals of "m" and "n" are so selected that the molecular weight of the short chain diol is of 50 or higher and less than 500. In general, they are 0 to 3. In a case of long chain diols, the numerals of "m" and "n" are so selected that the molecular weight of the long chain diol is of 500 or higher and less than 5,000. In general, they are 3 to 24, preferably 3 to 20, more preferably 4 to 15. If the numerals of "m" and "n" become larger than 24, the back coat layer is softened, and the running durability may be lowered. "X" preferably represents a hydrogen atom or methyl group, and more preferably, a methyl group. "X" in the parentheses with "m" and "n" does not necessarily represent the same group, and hydrogen atoms and methyl groups can coexist.

The desirable short chain diol as shown in Formula (1) is bisphenol A, hydrogenated bisphenol A and adducts of those with ethylene oxide or propylene oxide. The desirable long chain diol is a diol having a molecular weight of 500 to 5000 derived from bisphenol A or hydrogenated bisphenol A, more preferably, an adduct of bisphenol A with propylene oxide.

The content of the short chain diol is of 17 to 40% by weight with respect to the polyurethane resin, more preferably, 20 to 30% by weight. The content of the long chain diol is of 10 to 50% by weight, more preferably, 30 to 40 by weight.

The ether group of the long chain diol exists in an amount of 1.0 to 5.0 mmol/g in the polyurethane resin, more preferably 2.0 to 4.0 mmol/g. This makes adhesive property to the particles better and dispersing property better. In addition, this makes solubility to the solvent better.

Diols other than short chain diols and long chain diols can be used together. More specifically, aliphatic diols such as ethylene glycol, 1,3-propylenediol, 1,2-propyleneglycol, 1,4-butandiol, 1,5-pentandiol, 1,6-hexanediol, 2,2-dimethylpropanediol, 1,8-octanediol, 1,9-nonandiol, and diethyleneglycol, and an adduct of N-diethanolamine with ethylene oxide or propylene oxide can be exemplified.

As examples of organic diisocyanate compound to be reacted, exemplified are aromatic diisocyanates such as 2,4-trilenediisocyanate, 2,6-trilenediisocyanate, xylene-1,4-diisocyanate, xylene-1,3-diisocyanate, 4,4'-diphenylmethanediisocyanate, 4,4'-diphenyletherdiisocyanate, 2-nitrodiphenyl-4,4'-diisocyanate, 2,2'-diphenylpropane-4,4'-diisocyanate, 4,4-diphenylpropanediisocyanate, m-phenylenediisocyanate, p-phenylenediisocyanate, naphthylene-1,4-diisocyanate, naphthylene-1,5-diisocyanate, 3,3'-dimethoxydiphenyl-4,4'-diisocyanate, aliphatic diisocyanates such as lysinediisocyanate, and alicyclic diisocyanates such as isophoronediisocyanate, hydrogenated trilenediisocyanate, and hydrogenated diphenyletherdiisocyanate.

Since the polyurethane resin obtained through reactions has a ring structure portion or portions, the magnetic layer prepared in use of this resin has a higher strength, a higher glass transition temperature, and a higher durability. Where branched methyl is introduced, the dispersing property will be improved since the solubility to a solvent is improved.

The glass transition temperature Tg of the polyurethane resin is of −20 to 150° C., preferably 20 to 120° C., more preferably 50 to 100° C. It is preferable to prepare the binder composition so that both of proper calendar formation and proper coating strength are accomplished by rendering the glass transition temperature Tg of the coating film an optimum value in which the glass transition temperature Tg is of 50 to 150° C., preferably 70 to 100° C. and in which the calendar processing temperature +30° C. is equal to the glass transition temperature Tg of the coating film, where the long chain diol has a ring portion made of either an aliphatic or aromatic compound.

The binder is generally hardened by a polyisocyanate hardener. The used amount of the hardener, with respect to 00 parts by weight of the polyurethane resin is 0 to 150 arts by weight, preferably 0 to 100 parts by weight, more preferably 0 to 50 parts by weight.

The content of the hydroxyl group in the polyurethane resin is preferably, 3 to 20 pieces per one molecule, more preferably, 4 to 5 pieces per one molecule. If the amount less than 3 pieces per molecule, the reactions with the polyisocyanate hardener are reduced, thereby likely lowering the coating film strength and the durability. If the amount is more than 20 pieces, the solubility to the solvent and the dispersing property are likely lowered.

To adjust the content of the hydroxyl groups in the polyurethane resin, a compound having trifunctional or higher hydroxyl groups can be used. Specifically, exemplified are trimethylolethane, trimethylolpropane, trimellitic acid anhydride, glycerin, pentaerythritol, hexanetriol, dibasic acid made from polyesterpolyol as set forth in Japanese Patent Publication (KOKOKU) Heisei No. 6-64,726, branched polyester having trifunctional or higher hydroxyl groups obtained from the dibasic acid as a glycol component, and polyetherester. Trifunctional resins are preferable, and if the resin is tetrafunctional or higher, the resin is easily gelled during the reaction process.

The polyurethane resin preferably contains at least one type of polar groups selected from $-SO_3M$, $-OSO_3M$, $-COOM$, $-PO_3MM'$, $-OPO_3MM'$, $-NRR'$, and $-N^+RR'R''COO^-$ (wherein each of M and M' denotes a hydrogen atom, an alkali metal, an alkaline earth metal, or ammonium salt, and R, R' and R'' represents alkyl groups having a carbon number of 1 to 12, respectively), and more particularly, $-SO_3M$, $-OSO_3M$. The amount of those polar groups is preferably, $1 \times 10^{-5}$ to $2 \times 10^{-4}$ eq/g, more preferably, $5 \times 10^{-5}$ to $1 \times 10^{-4}$ eq/g. If the amount is less than $1 \times 10^{-5}$ eq/g, adhesion to the particles may become inadequate, and the dispersing property may be lowered. If the amount is more than $2 \times 10^{-4}$ eq/g, the resin loses solubility to the solvent, so that the dispersing property may be lowered.

The mean molecular weight number (Mn) of the polyurethane resin is preferably of 5,000 to 100,000, more preferably, 10,000 to 50,000, further preferably, 20,000 to 40,000. If it is less than 5,000, the coating film has a weak strength and low durability. If it is more than 100,000, the resin has a low solubility to the solvent and a low dispersing property.

The ring structure of the polyurethane resin affects the rigidity of the resin, and the ether group contributes to the softness of the resin. The polyurethane resin has a high solubility, a large inertia radius (dispersions of molecules), and a good dispersing property of the particles. The resin also has two features of the polyurethane resin itself, hardness (high Tg, and high Young's modulus), and tenacity (extension).

The paints for forming magnetic layers can contain, in addition to the above components, normally used additives or fillers such as abrasives such as $\alpha-Al_2O_3$, $Cr_2O_3$, antistatic agents such as carbon black, lubricants such as aliphatic acid, aliphatic acid ester, silicone oil, and dispersants.

The magnetic layer of the magnetic recording medium of the invention preferably has a Tg of 30° C. or higher but of 150° C. or less in terms of improvements of running durability. The thickness of the magnetic layer is preferably of 0.03 to 0.5 μm, more preferably 0.05 to 0.3 μm in terms of sharp magnetic reversions to enhance the digital recording performance. The magnetic recording medium of the invention further has the squareness of 0.82 or higher and SFD of 0.5 or less in terms of high output and high easing property.

The magnetic recording medium of the invention widely includes a structure having a magnetic layer on one side of the aromatic polyamide film. The magnetic recording medium of the invention also includes a structure having a layer or layers other than the magnetic layer. For example, the medium can have a back coating layer provided on the side opposite to the magnetic layer, a nonmagnetic layer containing nonmagnetic powders, a soft magnetic layer containing soft magnetic powders, a second magnetic layer, a cushion layer, an over coating layer, an adhesive layer, and a protection layer. Each of those layers can be formed at an appropriate position so that function of each layer can be displayed effectively.

A desirable magnetic recording medium of the invention is a magnetic recording medium having a nonmagnetic layer containing nonmagnetic inorganic particles and a binder between the aromatic polyamide film and the magnetic layer. The nonmagnetic inorganic particles can be selected from inorganic compounds or nonmagnetic metal such as metal oxides, metal carbonates, metal sulfates, metal nitrides, metal carbides, and metal sulfides. As inorganic compounds, exemplified are, e.g., titanium oxide ($TiO_2$, TiO), α-alumina having an alpha-conversion ratio of 90% to 100%, β-alumina, γ-alumina, α-iron oxide, chrome oxide, zinc oxide, tin oxide, tungsten oxide, vanadium oxide, silicon carbide, cerium oxide, corundum, silicon nitride, titanium carbide, silicon dioxide, magnesium oxide, zirconium oxide, boron nitride, calcium carbonate, calcium sulfate, barium sulfate, molybdenum disulfate, goethite, aluminum hydroxide, and so on solely or in combination. Particularly, titanium dioxide, zinc oxide, iron oxide, barium sulfide are preferable, and titanium dioxide, and iron oxide are more preferable. As a nonmagnetic metal, Cu, Ti, Zn, Al and so on are exemplified. The mean particle diameter of those nonmagnetic powders is 0.005 to 2 μm, but nonmagnetic powders having a different mean particle diameter may be combined when necessary, or ∩nmagnetic powders of one type having a wider profile of particle diameters may be used to obtain substantially the same result. Particularly, it is preferable that the nonmagnetic powders have the mean particle diameter of 0.01 μm to 0.2 μm. The pH of the nonmagnetic powders is preferably of 6 to 9. The nonmagnetic powders have a specific surface area of 1 to 100 m²/g, preferably 5 to 50 m²/g, more preferably, 7 to 40 m²/g. The nonmagnetic powders preferably have a crystallite size of 0.01 μm to 2 μm. The oil absorption amount using the DBP is 5 to 100 ml/100 g, preferably 10 to 80 ml/100 g, more preferably, 20 to 60 ml/100 g. The specific gravity is 1 to 12, preferably 3 to 6. The shape can be any of an acicular shape, spindle shape, spherical shape, polygonal shape, and plate shape.

Those for the magnetic layer are applicable to the binders, the lubricants, the dispersants, the additives, the solvents, and the dispersing methods and the like for the nonmagnetic layer. Particularly, publicly known technologies for the magnetic layers are also applicable to the amount and kind of the binder, and the amount and kind of the additives and dispersants.

With respect to the thickness of the layers, the magnetic layer can be, for example, 0.03 to 1 μm, preferably 0.05 to 0.5 μm, more preferably 0.05 to 0.3 μm, whereas the nonmagnetic layer can be, for example, 0.1 to 3 μm, preferably 0.5 to 3 μm, more preferably 0.8 to 3 μm. The thickness of the nonmagnetic layer is preferably thicker than the thickness of the magnetic layer. A magnetic recording medium may preferably have two magnetic layers. In such a case, for example, the upper layer is 0.2 to 2 μm, preferably 0.2 to 1.5 μm, and the lower layer is 0.8 to 3 μm. Where the magnetic layer is formed solely, the thickness is ordinarily 0.1 to 5 μm, preferably 0.1 to 3 μm, and more preferably 0.1 to 1.5 μm. Where a soft magnetic layer is formed between the aromatic polyamide film and the magnetic layer, for example, the thickness of magnetic layer can be set to 0.03 to 1 μm, preferably 0.05 to 0.5 μm, and that of the soft magnetic layer can be set to 0.8 to 3 μm.

The thickness of the back coat layer formed on the magnetic recording medium of the invention is preferably set n a range of 0.05 to 0.5 μm, more preferably in a range of 05 to 0.4 μm, further preferably in a range of 0.05 to 3 μm.

Particulate oxides are preferably used to the back coating layer of the magnetic recording medium of the invention. As such particulate oxides, any of titanium ides, α-iron oxides, and the mixture of those can be used. Ordinary titanium oxides and α-iron oxides can be used here.

The shape of the particles is not specifically limited. In a case of a spherical shape, proper particles have a particle size of 0.01 to 0.1 μm, and in a case of an acicular shape, it is proper to have an acicular aspect of 2 to 20 and a preferable major axis length of 0.05 to 0.3 μm.

A part of the surface of the particulate oxides can be modified to other compounds or can be covered wit other compounds such as, e.g., $Al_2O_3$, $SiO_2$, and $ZrO_2$.

The back coating layer may preferably contain carbon black to prevent static from building up. As the carbon black used for the back coating layer, those ordinarily used for magnetic recording tapes can be used widely. For example, used are furnace black for rubbers, thermal black for rubbers, coloring carbon black, acetylene black, and so on. The carbon black preferably has a particle diameter of 0.3 μm or smaller to prevent undulations on the back coating layer from transferring to the magnetic layer. The carbon black more preferably has a particle diameter of 0.01 to 0.1 μm. The used amount of the carbon black in the back coating layer is preferably set 1.2 or less as the optical transparent concentration (transmission amount measured by TR-927 (product name)) made by Macbeth Co.

To improve the running durability, it is advantageous to use carbon blacks of two types having different mean particle sizes. In such a case, a desirable combination is made of a first carbon black having the mean particle size in a range of 0.01 to 0.04 μm and a second carbon black having the mean particle size in a range of 0.05 to 0.3 μm. The desirable content of the second carbon black is 0.1 to 10 parts by weight where the total amount of the particle oxides and the first carbon black is 100 parts by weight, and more preferably 0.3 to 3 parts by weight.

The weight ratio of the particulate oxides to the carbon black is set to 60/40 to 90/10, more preferably, 70/30 to 80/20. Where the particulate oxides are contained more than the carbon black, a back coating layer can be formed with a good dispersing property of the particles and a smooth surface. The paint for forming the back coating layer having such compositions has a high thixotrophy in comparison with conventional paints for forming back coating layer essentially containing carbon blacks. Therefore, the paint can be coated by an extrusion method or a gravure method because of its high concentration. By application of such a high concentration paint, a back coating layer can be formed which strongly adhering to the support even through having a thin film thickness and which having a high dynamic strength.

The used amount of the binder is selected from a range of 10 to 40 parts by weight where the total amount of the particulate oxides and the carbon black is 100 parts by weight, and more preferably, 20 to 32 parts by weight. The film strength of the back coating layer thus formed is high and has a low surface electric resistance.

For the binder for the back coating layer in the invention, conventionally known thermoplastic resins, thermosetting resins, reaction type resins can be used. The dried thickness of the back coating layer is about, ordinarily, 0.2 to 1 μm, and more preferably, 0.2 to 0.6 μm.

The magnetic recording medium of the invention can have a tape thickness of 4 to 9 μm because the back coating layer is hardly transferred onto the magnetic layer even where the layer is wound up and kept with a high tension.

The magnetic recording medium of the invention can be manufactured by applying a paint or evaporating a material on the surface of the running aromatic polyamide film so that the layer thickness after dried comes in, e.g., the above prescribed range. Plural magnetic paints or nonmagnetic paints can be applied sequentially or simultaneously as multilayered. As a coater for such magnetic paints, coaters for air doctor coating, blade coating, rod coating, extrusion coating, air knife coating, squeezing coating, dipping coating, reverse roller coating, transfer roller coating, gravure coating, kiss coating, cast coating, spray coating, spin coating, and so on can be used. Those are referred in, for example, "Saisin Coating Gijyutu (Coating Technology Updated)" published by Kabushiki Kaisha Sogo Gijyutu Center (Showa 58 (1983) May 31).

When a magnetic recording tape having two or more layers on one side is manufactured, the following methods can be used.

1. A lower layer is first applied with a coating apparatus commonly used for application of magnetic paints, e.g., a gravure coating, roll coating, blade coating, or extrusion coating apparatus, and an upper layer is then applied, while the lower layer is in a wet state, by means of a support-pressing extrusion coater such as those disclosed in U.S. Pat. Nos. 4,480,583; 4,681,062; and 5,302,206.

2. An upper layer and a lower layer are applied almost simultaneously using a single coating head having therein two slits for passing coating fluids, such as those disclosed in U.S. Pat. Nos. 4,854,262; 5,072,688; and 5,302,206.

3. An upper layer and a lower layer are applied almost simultaneously with an extrusion coater equipped with a back-up roll, such as that disclosed in Japanese Unexamined Patent Publication (KOKAI) Heisei No. 2-174965.

The back coating layer can be prepared by applying a paint for forming the back coating layer in which particulate components such as abrasives and antistatics and the binder are dispersed in an organic solvent on a side opposite to the side of the magnetic layer. If the particulate oxides are used more than the carbon black as in the preferred example as described above, the paint for forming the back coating layer can be prepared without roll kneading, which is used to be required conventionally, because an adequate dispersion can be guaranteed. If a carbon black containing ratio is low, the remaining cyclohexane amount can be reduced after the drying process even where a cyclohexane is used as a solvent.

The coated magnetic layer is dried after the ferromagnetic field powders contained in the magnetic layer are subject to a processing for magnetic field orientation. The processing for magnetic field orientation can be done by a method widely known to persons skilled in the art.

The magnetic layer is processed to have the surface of the magnetic layer smoother using a super calendar roller or the like after dried. By such a surface smoothing process, voids created by removals of the solvent when dried are eliminated, and the filling rate of the ferromagnetic powders is improved. Therefore, a magnetic recording tape can be produced with a high electromagnetic characteristics.

As a calendar processing roller, a heat resistance plastic roller made of epoxy, polyimide, polyamide, polyamideimide, and so on can be used. A metal roller may be used for the processing.

The magnetic recording medium according to the invention preferably has a well-smooth surface. To render the surface smooth, it is effective to use, e.g., the calendar processing over the magnetic layer formed upon selecting a specific binder as described above. The calendar processing is implemented by setting the temperature of the calendar at 60 to 100° C., preferably, 70 to 100° C., more preferably 80 to 100° C., the pressure at 100 to 500 kg/cm, preferably, 200 to 450 kg/cm, further preferably 300 to 400 kg/cm. The obtained magnetic recording tape can be used upon slitting it into a prescribed size using a cutting machine or the like. The magnetic recording tape subjecting to the calendar processing is generally thermally treated.

The magnetic recording medium of the invention preferably has a center-face surface roughness Ra, measured by a light interference type surface roughness meter, of 5.0 nm or less, preferably 4.5 nm or less where the measured range is 121 μm×92 μm, and of 8.5 nm or more and 21.5 nm or less where the measured range is 1.2 mm×0.9 mm. Where the medium has such undulations, the magnetic recording medium advantageously has good electromagnetic characteristics and good running durability.

EXAMPLE 1

Film Formation of an Aramide Film
[Manufacturing of poly(paraphenyleneterephthalamide): PPTA film]

A PPTA having a ηinh (logarithmic viscosity) of 5.5 was dissolved in a sulfuric acid of 99.7% with the PPTA concentration of 11.5%, and a dope having an optical isomerism at 60° C. was obtained. When the viscosity of the dope was measured at a normal temperature, it was 10600 poises. To make this easily formed into a film, the dope was degassed in vacuum while kept at about 70° C. In this case, the material had an optical isomerism as described above and a viscosity of 4400 poises. The material was filtered when brought from a tank and cast on a belt made by tantalum finished with mirror surfaces (traveling at 12 m/min) from a die having a slit of 0.15 mm×300 mm with a spraying line speed of 3.5 m/min where a curving pipe of 1.5 m reaching the die via a gear pump is kept at about 70° C., and air at about 90° C. having a relative humidity of about 85% was blown to render the flown dope optically isotropic, and the dope was solidified upon introduced into a sulfuric acid solution of 15% by weight at −5° C. together with the belt. Then, the solidified film was pealed from a belt and rinsed by running through warm water of about 40° C., 1% aqueous solution of sodium carbonate, and water of 25° C. The rinsed film having a containing moisture content of about 280% was drawn uniaxially 1.2 times in a longitudinal direction (MD) utilizing circumference speed difference of rollers at a room temperature and then placed in a tenter and drawn 1.2 times in a width direction (TD) near the entrance. The film was then dried by heating in a fixed length at 150° C. around the center of the tenter, and where an infrared lamp was attached around the exit of the tenter, the film was then thermally processed at 400° C. to wind the longitudinal film. The obtained PPTA film had an excellent transparency and a thickness of 4.5 μm.

<Production method for magnetic tape>
Magnetic Layer

| Ferromagnetic metal micro particles | |
| --- | --- |
| Composition:Fe/Co = 100/30 | 100 parts |
| Hc | 2350 Oe, |
| BET specific surface area | 49 m$^2$/g |
| Crystallite size | 160 Å |
| Surface Covering Compound | Al$_2$O$_3$, SiO$_2$, Y$_2$O$_3$ |
| Particle size (major axis size) | 0.09/μm |
| Aspect ratio | 7 |
| σs | 145 emu/g |
| Vinyl chloride copolymer MR-100 made by Nippon Zeon, Co., Ltd | 10 parts |
| Polyurethane resin | 6 parts |
| α-Al$_2$O$_3$ (average particle size, 0.15 μm) | 5 parts |
| Carbon black (average particle size, 0.08 μm) | 0.5 parts |
| Butyl stearate | 1 part |
| Stearic acid | 5 parts |
| Methyl ethyl ketone | 90 parts |
| Cyclohexanone | 30 parts |
| Toluene | 60 parts |

Regarding the above paint, each component was kneaded with an open kneader and then dispersed using a sand mill. A polyisocyanate (Coronate L made by Nihon Polyurethan Kogyo K.K.) of 5 parts was added to the obtained dispersed liquid, and a mixture solvent of a methyl ethyl ketone and a cyclohexanone of 40 parts was added. The processed liquid was filtered using a filter having a mean mesh size of 1 μm to prepare a coating liquid. The obtained coating liquid was coated on the PPTA film on a surface having a surface roughness of 0.0015 μm to form the magnetic layer having the dry thickness of 1.5 μm. While the magnetic coating layer was still in a wet state, the layer was subject to magnetic field orientation created by a cobalt magnet having a magnetic force of 5,000 G and a solenoid having a magnetic force of 6,000 G and was dried, and after the layer was subjected to calendering treatment with calender of seven stages constituted of metal rollers and epoxy resin rollers at a temperature of 100° C. with a speed of 200 m/min, a back coating layer of a thickness of 0.5 μm is coated. Then, digital videotapes were manufactured by slitting the film into a 6.35 mm width.

EXAMPLE 2

This example is a medium constituted of two layers, using the magnetic layer of above Example 1 as an upper layer, and a lower layer having the following prescription.

| Lower Coating Layer (Nonmagnetic) | |
| --- | --- |
| Nonmagnetic Powders α-Fe$_2$O$_3$ Hematite | 80 parts |
| Mean length of major axis | 0.15 μm |
| BET specific surface area | 52 m$^2$/g |
| pH | 8 |
| Tap density | 0.8 |
| DBP absorption | 27–38 mg/100 g |
| Surface Covering Compound | Al$_2$O$_3$, SiO$_2$ |
| Carbon black | 20 parts |
| Average primary-particle size | 16 μm |
| DBP absorption | 80 ml/100 g |
| pH | 8.0 |
| BET specific surface area | 250 m$^2$/g |
| Volatile content | 1.5% |
| Vinyl chloride copolymer MR-100 made by Nippon Zeon, Co., Ltd | 12 parts |

-continued

| Lower Coating Layer (Nonmagnetic) | |
|---|---|
| Polyester polyurethane resin | 5 parts |
| α-Al$_2$O$_3$ (mean particle size 0.2 μm) | 1 part |
| Butyl stearate | 1 part |
| Stearic acid | 1 part |
| Methyl Ethyl Ketone | 100 parts |
| Cyclohexanone | 50 parts |
| Toluene | 50 parts |

Regarding the above paint, each component was kneaded with an open kneader and then dispersed using a sand mill. A polyisocyanate (Coronate L made by Nihon Polyurethan Kogyo K.K.) of 5 parts was added to the obtained lower layer dispersed liquid to form a coating liquid for lower coating layer, and a mixture solvent of a methyl ethyl ketone and a cyclohexanone of 40 parts was added. The processed liquid was filtered using a filter having a mean mesh size of 1 μm to prepare the lower layer coating liquid and the coating liquid for upper magnetic layer which is prepared in the same manner as in Example 1 were simultaneously coated on a surface having a surface roughness of 0.001 μm of a polyamide film having a thickness of 4.5 μm so as to form the dry thickness of the nonmagnetic undercoating layer and the upper magnetic layer of 1.3 μm and 0.25 μm, respectively. While both coating layers were still in wet condition, it was oriented by means of, in succession, a cobalt magnet having a magnetic force of 5,000 Gauss and a solenoid having a magnetic force of 4,000 Gauss. Then the resulting material was dried and further subjected to calendering treatment by passing the material between seven nips each of which comprises a pair of a metal roll and an epoxy resin roll at a temperature of 100° C. with a speed of 200 m/min. Thereafter, a back coating layer of a thickness of 0.5 μm is coated. Then, digital videotapes were manufactured by slitting the film into a 6.35 mm width.

COMPARATIVE EXAMPLE 1

2-Chloro-p-phenylenediamine of 11.40 g, lithium chloride anhydride of 28 g, 4,4'-diaminodiphenylsulfone of 3.74g were dissolved by agitation in dried N-methylpyrrolidone of 500 ml and cooled at 0° C. Terephthalic acid chloride of 19.29 g was added to this at a time and heated up to a room temperature after agitated as it was for two hours, and neutralized by adding solid lithium hydroxide of 4.8 g. This crude liquid was agitated and precipitated with a large amount of water and dried at 100° C. under a reduced pressure to obtain a copolymer polyamide (B). It indicated a limited viscosity of 2.95 dl/g at 25° C. under a concentration of 0.5 g/100 ml in concentrated sulfuric acid.

On the other hand, terephthalic acid chloride and para-phenylenediamine were polymerized in dimethylacetoamide containing calcium chloride to obtain polyphenyleneterephthalamide (A) of a ηinh of 3.5.

Those polymers were measured in a mixer having a jacket with a jacket temperature of 70° C. so as to set the polymers of a weight ratio of:

(A)/[(A)+(B)]=0.03, and dissolved in concentrated sulfuric acid of 99.5%, thereby producing a dope containing a polymer of 11%. Subsequently, alumina particles having a mean primary particle size of 15 nm and a Mohs' scale of hardness of 7.5 and a crystal formation of the δ type were added for a fixed amount to the dope and mixed and agitated.

This polymer solution was flown on a belt after passing through a filter of a 10 μm cut, and a film that gained self-preservation property by heating for two minutes with 180° C. hot air to evaporate the solvent was continuously peeled from the belt. Subsequently, the film is introduced in a water bath for water extraction of an inorganic salt created by the residual solvent and neutralization, and then, dried and was subject to a thermal processing at a tenter to produce an aromatic polyamide film having a thickness of 12 μm. During those steps, the film was drawn 1.2 times in the film longitudinal direction and 1.3 times in the width direction, and the thermal processing was made for 1.5 minutes at 280° C.

The mean agglutination degree of alumina particles contained in this film was 25. The hardness of the film was 32; tensile modulus was 1300 kg/mm$^2$; F-1 value was 13 kg/mm$^2$; heat shrinkage rate at 200° C. for 10 minutes was 0.2%; the film had good mechanical property and thermal property.

The thickness of the obtained polyamide film was 4.5 μm. Subsequently, the magnetic layer, the nonmagnetic layer, and the back coating layer were coated in the same manner as Example 2, and a digital videotape having a 6.5 mm width with a thickness of the whole layers of 6.5 μm was produced.

COMPARATIVE EXAMPLE 2

A PET (polyethyleneterephthalate) film was used for a support. The used PET film was produced as follows:

Calcium carbonate (mean particle size of 0.5 micron), having a weight reduction rate of 1.0% by weight at 500° C., of 15 part by weight was added to ethylene glycol (hereinafter called to as "EG") of 85 parts by weight, and subsequently, a slurry was obtained by mixing and agitating them. The supernatant liquid of the slurry had 800 ppm after passing a filter.

Then, after dimethylterephthalate of 100 parts by eight and the EG of 70 parts by weight were subject to an ester interchange in an ordinary manner with a calcium acetate 4 hydrate of 0.035 parts by weight as a catalyst, and added to the obtained calcium carbonate (concentration: 0.3% by weight with respect to the polymer) while the calcium carbonate was agitated. A polycondensation reaction was made in an ordinary manner under a high temperature in vacuum after a trimethyl phosphate of 0.03 part by weight, an antimony trioxide of 0.03 parts by weight were added, thereby producing polyethyleneterephthalate pellets having a limited viscosity of 0.620. The obtained polyethyleneterephthalate (hereinafter, abbreviated as "PET") pellets were dried for three hours and then supplied to a hopper of an extruder. The pellets were melted at a melting temperature of 280 to 300° C., and the melting polymer was extruded from a slit from die with a one-mm slit onto a cooled rotary drum having a surface temperature of 20° C. with a surface finish of about 0.3S, thereby creating a not yet drawn film having a thickness of 200 μm.

The not yet drawn film thus obtained as described above was preheated at a temperature of 75° C., and was heated and drawn 1.8 times with an IR heater whose surface temperature was at 900° C. provided 15 mm above between a low speed roller and a high speed roller by using the rolling surface speed difference between the high and low speed rollers. The film was repeatedly subject to drawing of 1.5 times after rapid cooling, and was then fed to a tenter and drawn 3.8 times in a lateral direction at 105° C. The obtained biaxially drawn film was thermally fixed for five seconds at a temperature of 205° C., and the biaxially drawn, thermally fixed film was re-heated at a temperature of 120° C. and was relaxed in a longitudinal direction with a relaxing rate of 0.5% (speed difference between the heating rollers and the cooling rollers). Characteristics of the obtained film were examined.

The thickness of the obtained polyester film was 4.5 μm. Subsequently, the magnetic layer, the nonmagnetic layer, and the back coating layer were coated in the same manner as Example 2, and a digital videotape having a 6.5 mm width with a thickness of the whole layers of 6.5 μm was produced.

<Measurement method of loss tangent>

A measuring apparatus for dynamic viscoelasticity (Rheovibron made by Toyo Baldwin Co., Ltd.) was used to measure dynamic viscoelasticity of the support film at a frequency of 110 Hz. This method is to seek the viscoelasticity by time lag when a vibration was given to one end of the tape and transmitted to the other end.

<Reproduction Output>

A table type VCR (made by Matsushita Electric) as a commercially available digital VCR (DVC) was used for observation of data output waveform at 25° C., 60% RH. In comparison with a reference tape made by a Fuji Photo Film Co. the lowest output region was set as the reproduction output.

<Running for Cueing and Reviewing>

The table type VCR (made by Matsushita Electric) as a commercially available digital VCR (DVC) was used. Cueing and reviewing were repeated for 1,000 times in a circumstance of 25° C., 60% RH.

<Full length running>

The table type VCR (made by Matsushita Electric) as a commercially available digital VCR (DVC) was used. Playing and rewinding were repeated for 100 times in a circumstance of 40° C., 80% RH. It was indicated by an instant pitfall number in a single pass that having worst number of instant pitfalls (120 μsec or longer: −3 dB) among 100 passes.

In addition to the full length running, winding amount was evaluated. Before starting the full length running, the film was wound 380 m by a supply reel, and the roll diameter was measured. Subsequently, recording was made across the full length, and after playing and rewinding were made 100 times, the pack diameter was measured after the film was taken up around the supply reel. The increased amount of the pack diameter between pre-running and post-running was evaluated as an irregularly wound amount. An amount of 0.4 mm or lower is preferable in a practical sense.

invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A magnetic recording medium comprising:
   a nonmagnetic support,
   a nonmagnetic layer mainly containing one or more nonmagnetic inorganic powders and a binder formed on the nonmagnetic support, and
   a magnetic layer containing a ferromagnetic powder and a binder having a thickness of 0.05 μm or larger and 1.0 μm or lower formed on the nonmagnetic layer;
   wherein the nonmagnetic support is a biaxially oriented film made of aromatic polyamide resin and the biaxially oriented aromatic support has a ratio of the loss, and the loss tangent at the temperature of 100° C. is 0.05 or lower.

2. The magnetic recording medium according to claim 1 wherein the ratio of the loss tangent at a temperature of 40° C. to the loss tangent at a temperature of 100° C. of 1.0 or higher.

3. The magnetic recording medium according to claim 1, wherein the loss tangent at the temperature of 100° C. is 0.01 or higher.

4. The magnetic recording medium according to claim 1 wherein the aromatic polyamide resin is a resin containing 50% or more of units represented by a general formula —NHCO—$Ar_1$—CONH—$Ar_2$— wherein, $Ar_1$ and $Ar_2$ are bivalent organic groups including at least one aromatic ring whose carbon number is within 6 to 25 or —CO—$Ar_3$—NH— wherein $Ar_3$ is a bivalent organic group including at least one aromatic ring whose carbon number is within 6 to 25.

TABLE 1

|  | Example 1 | Example 2 | Comparative Example 1 | Comparative Example 2 |
|---|---|---|---|---|
| Base Type | Aramide | Aramide | Aramide | PET |
| tanδ(40° C.) | 0.03 | 0.032 | 0.032 | 0.019 |
| tanδ(100° C.) | 0.035 | 0.033 | 0.069 | 0.074 |
| tanδ(40° C.)/tanδ(100° C.) | [1.14] 0.86 | [1.2] 0.97 | 0.47 | 0.26 |
| Reproduction output (db) | −0.5 | 0 | 0 | −3 |
| Cueing and reviewing running 1000 passes | Success | Success | Success | Cut off at 300 passes |
| Instant pitfalls during full length running | 3 times | 2 times | 150 times | 2 times |
| Irregularly wound amount (mm) | 0.1 mm | 0 mm | 1.2 mm | 0 mm |

As a result shown in Table 1, Examples 1, 2 according to the invention apparently had high reproduction outputs, excellent running durability, and less irregularly wound amounts in comparison with Comparative Example 1 whose base material was the same, aramide.

The foregoing description of preferred embodiments of the invention has been presented for purposes of illustration and description, and is not intended to be exhaustive or to limit the invention to the precise form disclosed. The description was selected to best explain the principles of the 5. The magnetic recording medium according to claim 1 wherein the aromatic polyamide resin is selected from the group consisting of paraphenyleneterephthalamide, paraphenyleneisophthalamide, metaphenyleneterephthalamide and metaphenyleneisophthalamide.

6. The magnetic recording medium according to claim 1 wherein the aromatic polyamide resin is a polyparaphenyleneterephthalamide represented by the formula —(CO—Ph—CONH—Ph)n—.

* * * * *